Figure 1:
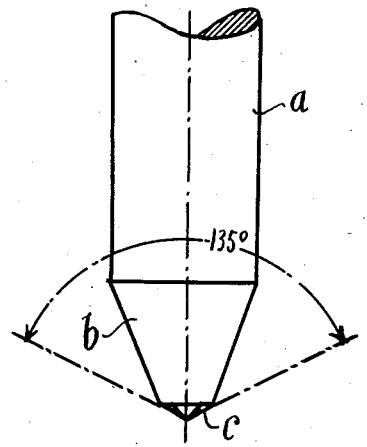

Patented June 19, 1951

2,557,148

UNITED STATES PATENT OFFICE 2,557,148

ENGRAVING TOOL FOR PANTOGRAPHIC JEWELRY ENGRAVING MACHINES

Norbert Schimmel, New York, N. Y., assignor to New Hermes Engraving Machine Corp., New York, N. Y., Application September 24, 1947, Serial No. 775,900

4 Claims. (Cl. 33—18)

The object of my invention is a non-rotary engraving tool for pantographic jewelry engraving machines operable by unskilled labor.

Up to the present with such machines has been used a rotary engraving tool, i. e. a milling cutter, and the depth of engraving is determined by a depth gauge or limiting stop in the form of a ring concentric with the tool, but offset backwardly axially, relative to the apex or point of the tool, by an amount equal to the desired depth of engraving. This stop rides upon the surface of the work piece directly adjacent the engraved groove and thereby prevents too deep penetration of the tool, no matter how strongly the worker may press the tool against the work piece.

It has been found in practice that engravings made in this manner are not satisfactory because the rotary cutter leaves working marks on the work piece so that the engravings do not have the smooth, shiny or glossy appearance of engravings made by a skilled engraver with his hand tool without use of any machine.

Besides the depth gauge, with strongly curved work pieces, prevents engraving in zones of the work piece which are at an angle sustantially differing from 90° relative to the axis of the tool thereby necessitating frequent readjusting or indexing of the work piece in addition to the adjusting or indexing of the tool from character to character to be engraved.

All attempts to avoid these drawbacks by using in the above mentioned pantographic machines instead of the rotary milling cutter a non-rotary engraving chisel not requiring a power drive have ended in failure until now.

Ordinarily, the tool had the form of the usual hand-operated engraving chisel and, therefore, had to be turned continuously by the hand of the operator independently of the travelling motion so as to present the cutting breast always at the right angle to the direction of travel. This, of course, requires a skilled operator.

Attempts to eliminate the need for turning the tool by using a chisel with a multi-breast pyramidal cutting point were also without success because such a chisel, in distinction from the handchisel of the skilled engraver, does not remove material in form of chips from the work piece but simply squeezes the metal apart laterally thus producing an unsightly elevated burr on both sides of the "scratched" groove produced.

By experiments continued over more than two years I eventually have found the reasons for this drawback and means for avoiding it completely.

I have found this drawback to be caused by the seemingly self-evident tendency to give the non-rotary pyramidal chisel a form as similar as possible to the above mentioned rotary milling cutter and, thus, to give the pyramid rather steep sides and a correspondingly small angle at the apex.

Such a chisel not only causes formation of the objectionable burr mentioned above, but also requires use of an also objectionable depth gauge because the steep-sided pyramid is so penetrative that without such a gauge there is danger of perforating and spoiling thin-walled work pieces such as watch cases and the like.

I have found by my experiments that, surprisingly, the above drawbacks disappear suddenly if, with a pyramid of three to eight sides the angle at its apex is made as big as 90° to 145°, and that best results are obtained with a pyramid of six sides and with an angle at the apex of the pyramid, i. e. with an angle at the apex of its circumscribed cone, of 135°.

Such a non-rotary pyramidal chisel, used in a hand-operated pantographic machine, produces engravings which cannot be distinguished even by a skilled engraver from engravings made with his hand tool.

Besides, the big and preferably obtuse angle at the apex of the pyramid has a surprising depth-gauging effect. Because of such angle the thickness of the pyramid increases rapidly toward its base. Thereby a rapid increase of resistance against increase of penetration into the work piece is caused. It has been found that for this reason the unavoidable differences in the pressure exerted by the hand of the same operator at different times, or exerted by different operators, do not result in noticeable differences in the engravings produced.

For the same reason an additional depth gauge and its above mentioned disadvantage is eliminated.

On the accompanying drawing a preferred embodiment of the invention is shown on an enlarged scale by way of example.

Figure 2:
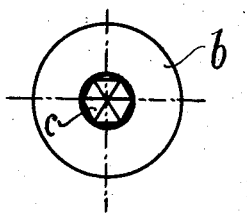

In this drawing is:

Figure 1 an elevation of an engraving chisel;

Figure 2 a bottom plan view of Figure 1.

The chisel consists of a cylindrical shaft $a$ connected by a conical intermediate part $b$ with the working end in form of a six-sided pyramid $c$.

According to the invention the angle of the apex of the pyramid, i. e. the angle at the apex of the cone circumscribed to the pyramid is of 135°.

The new chisel preferably is made from metal such as steel because I have found that diamond chisels frequently tend to break when too roughly handled by the unskilled operators of the pantographic machines.

It will be understood that using my new tool in a pantographic machine all the unskilled operator has to do is press the tool against the work piece and trace the pattern with the tracer.

Even a child, thus, is enabled to produce perfect engravings without any effort or special attention.

Reference is made to the application of Gruettner et al. Serial No. 746,508, filed May 7, 1947, assigned to a related company, for the pantographic jewelry engraving machine with which the engraving tool herein is useable.

By "negative rake" as used herein and in the claims it is intended to cover an angle of deviation of the leading side or top rake of the cutting tool greater than normal to the surface engraved, and "a leading angle with an angularity of from 45° to 17½°" is intended to cover an angle which is one-half of the difference between a straight angle and the maximum and minimum angle for the apex of the pyramid of between substantially 90° to 145°.

What I claim is:

1. An engraving tool for use with a non-rotary hand operated pantographic engraving machine by bodily sliding the tool with respect to the work, with negative rake upon pressure applied to the surface of the work comprising a shank of engraving material having an engraving point which is a pyramid with an angle of 90° to 145° at the apex of the circumscribed cone and a leading angle all around with regard to the work of from 45° to 17½°.

2. An engraving tool in accordance with claim 1 wherein the pyramid has six sides.

3. An engraving tool for use with a non-rotary hand operated pantographic engraving machine by bodily sliding the tool with respect to the work, with negative rake upon pressure applied to the surface of the work comprising a shank having an engraving point which is a pyramid of an angle of 135° at the apex of the circumscribed cone and a leading angle with regard to the work all around the shank of 22½°.

4. An engraving tool in accordance with claim 3 wherein the pyramid has six sides.

NORBERT SCHIMMEL.

REFERENCES CITED

The following references are of record in the file of this patent:

UNITED STATES PATENTS

| Number | Name | Date |
| --- | --- | --- |
| 729,758 | Goodnow et al. | June 2, 1903 |
| 962,062 | Stevens | June 21, 1910 |
| 1,058,955 | Fleisch | Apr. 15, 1913 |
| 1,257,654 | Varga | Feb. 26, 1918 |
| 1,908,774 | Maier | May 16, 1933 |